(12) United States Patent
Yoo

(10) Patent No.: US 8,163,244 B2
(45) Date of Patent: Apr. 24, 2012

(54) CYCLOPROPENES-GENERATING DEVICES TO CONTROL RIPENING PROCESSES OF AGRICULTURAL PRODUCTS

(76) Inventor: Sang-Ku Yoo, Gwacheon-si (KR)

( * ) Notice: Subject to any disclaimer, the term of this patent is extended or adjusted under 35 U.S.C. 154(b) by 952 days.

(21) Appl. No.: 12/094,225

(22) PCT Filed: Nov. 15, 2006

(86) PCT No.: PCT/KR2006/004812
§ 371 (c)(1),
(2), (4) Date: May 19, 2008

(87) PCT Pub. No.: WO2007/058473
PCT Pub. Date: Nov. 24, 2007

(65) Prior Publication Data
US 2008/0286426 A1 Nov. 20, 2008

(30) Foreign Application Priority Data
Nov. 18, 2005 (KR) .................. 10-2005-0110565

(51) Int. Cl.
*B01J 8/02* (2006.01)
*B01J 19/00* (2006.01)
*B01J 7/00* (2006.01)
*A23B 7/144* (2006.01)

(52) U.S. Cl. ......... 422/129; 422/211; 504/114; 504/189

(58) Field of Classification Search ............. 422/129, 422/211; 504/114, 189
See application file for complete search history.

(56) References Cited

U.S. PATENT DOCUMENTS

| 4,113,182 | A | * | 9/1978 | Brago ..................... 239/304 |
| 4,527,712 | A | * | 7/1985 | Cobbs et al. ................. 222/1 |
| 5,518,988 | A | | 5/1996 | Sisler et al. |
| 6,017,849 | A | | 1/2000 | Daly et al. |
| 6,426,319 | B1 | | 7/2002 | Kostansek |
| 6,444,619 | B1 | | 9/2002 | Kostansek |
| 6,452,060 | B2 | | 9/2002 | Jacobson |
| 6,548,448 | B2 | | 4/2003 | Kostansek |
| 6,762,153 | B2 | | 7/2004 | Kostansek et al. |
| 6,811,096 | B2 | | 11/2004 | Frazier et al. |
| 6,953,540 | B2 | | 10/2005 | Chong et al. |
| 2003/0220201 | A1 | | 11/2003 | Kostansek et al. |

FOREIGN PATENT DOCUMENTS
JP   10-094741   4/1998

OTHER PUBLICATIONS

W.E.Billups et al., "Uses of Adsorbed Reagents in the Synthesis of Reactive Molecules via Elimination Reactions", Tetrahedron vol. 42, No. 6, pp. 1575-1579, 1986.

(Continued)

*Primary Examiner* — Jennifer A Leung
(74) *Attorney, Agent, or Firm* — Cantor Colburn LLP

(57) ABSTRACT

Provided is a device for generation of cyclopropene compounds which is capable of achieving direct in situ preparation and application of cyclopropene compounds inhibiting the action of ethylene which accelerates the ripening process of plants, the device comprising a first storage part for storing precursors of cyclopropene compounds ("cyclopropene precursors"), a second storage part for storing reaction reagents which convert cyclopropene precursors into cyclopropene derivatives via chemical reaction, and a spray part for spraying the cyclopropene derivatives produced by the chemical reaction between the cyclopropene precursors and the reaction reagents.

19 Claims, 2 Drawing Sheets

OTHER PUBLICATIONS

W.E. Billups et al., "Synthesis of the Bicyclopropenyls", Tetrahedron vol. 50, No. 36, pp. 10693-10700, 1994.

Michael M. Haley et al. "Synthesis of Alkenyl—and Alkynylcyclopropenes" Tetrahedron Letter, vol. 36, No. 20, pp. 3457-3460, 1995.

Farley Fisher et al., "Synthesis of 1-Methylcyclopropene" Journal of Organic Chemistry 30 pp. 2089-2090, 1965.

Ronald M. Magid et al., "An Efficient and Convenient Synthesis of 1-Methylcyclopropene" Journal of Organic Chemistry 36 pp. 1320-1321, 1971.

J. M.R. Apollo Arquiza et al.,"1-Methylcyclopropene Interactions with Diphenylamine on Diphenylamine Degradation, alpha-Farnesene and Conjugated Trienol Concentrations, and Polyphenol Oxidase and Peroxidase Activities in Apple Fruit" Journal of Agricultural and Food Chemistry 53 pp. 7565-7570, 2005.

Domingo Martinez-Romero et al.,"1-Methylcyclopropene Increases Storability and Shelf Life in Climacteric and Nonclimacteric Plums" Journal of Agricultural and Food Chemistry 51 (2003), 4680-4686.

Luiz C. Argenta et al.,"Influence of 1-Methylcyclopropene on Ripening, Storage Life, and Volatile Production by d'Anjou cv. Pear Fruit" Journal of Agricultural and Food Chemistry 51 (2003), 3858-3864.

Rinaldi Botondi et al.,"Influence of Ethylene Inhibition by 1-Methylcyclopropene on Apricot Quality, Volatile Production, and Glycosidase Activity of Low- and High-Aroma Varieties of Apricots" Journal of Agricultural and Food Chemistry 51 (2003), 1189-1200.

Xuetong Fan et al., "Impact of 1-Methylcyclopropene and Methyl Jasmonate on Apple Volatile Production" Journal of Agricultural and Food Chemistry 47 (1999), pp. 2847-2853.

Mark S. Baird et al.,"The Preparation and Lithiation of 1-Halogenocyclopropenes" J. Chem. Soc. Perkin Trans. 1, 1986, 1845-1854.

Mark S. Baird et al.,"(R)-1,3-Dimethylcyclopropene-One Isomer of the Smallest Chiral Hydrocarbon" J. Chem. Soc. Perkin Trans 1, 1993, pp. 321-326.

Paul Binger "Eine einfache Synthese von 3,3-dimethylcyclopropen" Synthesis, 1974, 190.

W.E. Billups et al.,"1,3-Bridged Cyclopropenes" J. Am. Chem. Soc., 113 (1991), 7980-7984.

Ryo Mizojiri et al.,"Generation of a Silylethylene-Titanium Alkoxide Complex. A Versatile Reagent for Silylethylation and Silylethylidenation of Unsaturated Compounds" Journal of Organic Chemistry 65 (2000), pp. 6217-6222.

T. H. Chan et al,"Entry into the Cyclopropene System VIA Vinylsilanes" Tetrahedron Letter. No. 39,(1975), pp. 3383-3386.

Martin G. Banwell et al.,"Generation and Solution-phase Behaviour of Some 2-Halogeno-1,3-ring-fused Cyclopropenes" J. Chem. Soc. Perkin Trans 1, 1993,pp. 945-963.

W.E. Billups et al., "Spiropentadiene" J. Am. Chem. Soc., 113 (1991), 5084-5085.

W.E. Billups et al.,"Synthesis of Oxaspiropentene" Organic Letters, vol. 1, No. 1, (1999), pp. 115-116.

International Search Report for corresponding International Application No. PCT/KR2006/004812 dated Feb. 5, 2007.

Written Opinion of the International Searching Authority for corresponding International Application No. PCT/KR2006/004812 dated Feb. 5, 2007.

* cited by examiner

CYCLOPROPENES-GENERATING DEVICES TO CONTROL RIPENING PROCESSES OF AGRICULTURAL PRODUCTS

FIELD OF THE INVENTION

The present invention relates to a device for generation of cyclopropene compounds. More specifically, the present invention relates to a device for generation of cyclopropene compounds, which is capable of achieving convenient in situ preparation and spray of cyclopropene compounds such as cyclopropene, 1-methylcyclopropene and the like, which are known to inhibit the action of ethylene associated with ripening processes of plants such as fruits, flowers, vegetables and the like, as necessary.

BACKGROUND OF THE INVENTION

Generally, cyclopropene derivatives can be prepared by reacting allyl halides with strong bases [J. Org. Chem. 30 (1965) 2089-2090; and J. Org. Chem. 36 (1971) 1320-1321]. In addition, with reference to some recent publications including U.S. Pat. No. 5,518,988, it can be seen that cyclopropene compounds having a relatively simple structure, such as cyclopropene, 1-methylcyclopropene and the like, exhibit excellent inhibitory effects on the ripening process of plants [J. Agric. Food Chem. 53 (2005), 7565-7570; J. Agric. Food Chem. 51 (2003), 4680-4686; J. Agric. Food Chem. 51 (2003), 3858-3864; J. Agric. Food Chem. 51 (2003), 1189-1200; and J. Agric. Food Chem. 47 (1999), 2847-2853].

In particular, among these cyclopropene compounds, cyclopropene (boiling point of −36 to −35° C./744 mmHg) and 1-methylcyclopropene (boiling point of 12° C./760 mmHg) is present in a gaseous phase at room temperature and therefore can be easily treated throughout a storage space of agricultural products, even without an additional spray device.

However, the cyclopropene compounds including cyclopropene and 1-methylcyclopropene are chemically unstable. Therefore, if such cyclopropene compounds are not stored at a low temperature (below −100° C.), they may easily undergo loss of their chemical properties through dimerization etc. In order to solve the problems associated with the storage of these compounds, a variety of research has been actively undertaken to find a method for safe storage of the cyclopropene compounds.

For example, U.S. Pat. Nos. 6,017,849, 6,426,319, 6,444,619, 6,548,448, 6,762,153 and 6,953,540 disclose safe storage methods of cyclopropene derivatives, particularly 1-methylcyclopropene and application thereof to target sites. That is, these patents disclose the encapsulation of small molecules such as 1-methylcyclopropene into macromolecules such as α-cyclodextrin. More specifically, 1-methylcyclopropene is safely stored using α-cyclodextrin, and α-cyclodextrin complex containing 1-methylcyclopropene is treated with water, upon using thereof for desired applications. The added water molecules gradually infiltrate into α-cyclodextrin, thus leading to the release of 1-methylcyclopropene to the outside, and therefore the released 1-methylcyclopropene acts on plants to thereby inhibit the action of ethylene.

However, the above-mentioned techniques suffer from various disadvantages such as a difficulty to prepare 1-methylcyclopropene, a separate process of adsorbing 1-methylcyclopropene to α-cyclodextrin after preparation of 1-methylcyclopropene, a treatment of the 1-methylcyclopropene-containing α-cyclodextrin complex with water to release 1-methylcyclopropene from the complex for treatment of 1-methylcyclopropene on the plants, thus resulting in a long processing time and know-how for such treatment, consequently high processing costs.

To this end, as discussed hereinbefore, there is a strong need for the development of a technique which is capable of achieving convenient in situ preparation of cyclopropene derivatives in a simplified manner, followed by direct treatment thereof to the plants.

SUMMARY OF THE INVENTION

Therefore, the present invention has been made to solve the above problems and other technical problems that have yet to be resolved.

Specifically, an object of the present invention is to provide a device for generation of cyclopropene compounds, which is capable of achieving convenient in situ preparation and immediate application of cyclopropene derivatives having low storage stability by a simplified process.

In accordance with an aspect of the present invention, the above and other objects can be accomplished by the provision of a device for generation of cyclopropene compounds which is capable of achieving direct in situ preparation and application of cyclopropene compounds inhibiting the action of ethylene which accelerates the ripening process of plants, the device comprising a first storage part for storing precursors of cyclopropene compounds ("cyclopropene precursors"), a second storage part for storing reaction reagents which convert the cyclopropene precursors into cyclopropene derivatives via chemical reaction, and a spray part for spraying the cyclopropene derivatives produced by the chemical reaction between the cyclopropene precursors and the reaction reagents.

Therefore, the device for generation of cyclopropene compounds according to the present invention is characterized in that cyclopropene precursors having a relatively high chemical stability and reaction reagents capable of inducing chemical conversion of the precursors into desired compounds are individually stored in separate storage members, taking into consideration that cyclopropene derivatives to inhibit the ripening process of plants are chemically unstable, and when it is desired to use the cyclopropene derivatives, the reaction reagents and the cyclopropene precursors are allowed to contact and react each other to thereby produce desired products which are then appropriately sprayed, thus providing direct in situ preparation and convenient application of cyclopropene derivatives.

There is no particular limit to materials and configurations for the first storage part for storing the cyclopropene precursors and the second part for storing reaction reagents, so long as they can properly store reaction materials, and can discharge them upon application thereof. For example, the storage member may be in the form of a container having an outlet for supply of reaction materials on at least one side and made of a material inert to the reaction materials and reagents. That is, the storage part may be composed of the first storage container for storing the cyclopropene precursors and the second storage container for storing reaction reagents.

In one specific embodiment, the device further includes a reaction vessel selectively interconnected to the first storage container and the second storage container, and the spray part may be connected to the reaction vessel. Therefore, the cyclopropene precursors and the reaction reagents, supplied from individual storage containers, are contacted to undergo chemical reaction in the reaction vessel, thereby producing cyclopropene derivatives, and the resulting cyclopropene derivatives are discharged through the spray part. Where appropriate, the spray part may also be integrated into the reaction vessel as a part thereof.

In another embodiment, the spray part may be directly connected to the second storage container or otherwise may be integrated into the second storage container as a part thereof, and the first storage container may be selectively interconnected with the second storage container. Where appropriate, the device may be embodied in a different structure wherein the spray part is directly connected to the first storage container or otherwise is integrated into the first storage container as a part thereof, and the second storage container is selectively interconnected with the first storage container.

As used herein, the phrase "selectively interconnected" means that the interconnection part may be opened or closed, if necessary. As one example for this purpose, mention may be made of a structure in which each container is interconnected via the pipes, and the pipes are provided with control valves such as open-close type cocks. In yet another embodiment, the device may have a structure in which individual containers are adjacent to each other, openings for interconnection are formed at an adjoined area, and open-close type barriers are installed in the openings.

In one preferred embodiment, for easy spraying of the resulting cyclopropene derivatives, the device may further include a carrier supply part for a carrier gas as a medium toward the spray part. Examples of the carrier gas may include inert gas such as nitrogen, air, and the like. The carrier supply part may be, for example, a compressor for inducing gas stream. The carrier supply part is connected to the reaction vessel or the second storage container (or the first storage container) in the above-discussed embodiments and thereby facilitates migration of the cyclopropene derivatives to the spray part.

The spray part in the device of the present invention may have various configurations, and may optionally include, for example, a nozzle for controlling a spraying amount and direction of the cyclopropene derivatives, a heater for facilitating evaporation of liquid cyclopropene derivatives and a filter for removing chemical impurities produced from the reaction.

The cyclopropene derivatives prepared in the device of the present invention is a material represented by Formula I below:

(I)

wherein R is hydrogen; a $C_1$-$C_{10}$ alkyl such as methyl, ethyl, propyl, isopropyl, butyl, isobutyl, pentyl, isopentyl, hexyl, heptyl, octyl, phenyl, methoxymethyl, methoxyethyl, ethoxymethyl or ethoxyethyl; or a substituted alkyl containing oxygen, nitrogen, sulfur, silicon or halogen.

Preferably, the cyclopropene derivative is a material which is gaseous or is readily evaporable at room temperature. For example, mention may be made of cyclopropene, 1-methylcyclopropene, 1-ethylcyclopropene, 1-propylcyclopropene, 1-butylcyclopropene, 1-pentylcyclopropene, 1-hexylcyclopropene, 1-heptylcyclopropene, 1-octylcyclopropene and any combination thereof.

Particularly, cyclopropene and 1-methylcyclopropene per se are gaseous at room temperature, and therefore can be easily discharged to the surroundings, without using additional separate members in the device of the present invention. In addition, precursors thereof are chemically stable and can thus be easily stored.

The cyclopropene derivative can be prepared by various synthetic methods known in the art. Representative methods are as follows.

As the first method, the cyclopropene derivative can be prepared by reacting an allyl halide or equivalent thereof with a base [J. Org. Chem. 36 (1971), 1320-1321; J. Org. Chem. 30 (1965), 2089-2090; and U.S. Pat. No. 6,452,060].

The reaction scheme for the above synthetic process is as follows.

[Reaction Scheme 1]

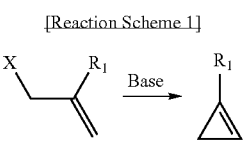

As the second method, the cyclopropene derivative can be prepared by the reaction of a strong base such as methyllithium with trihalocyclopropane which can be easily obtained from the reaction of halo-olefin and dihalocarbene. In this process, halocyclopropene and cyclopropenyl anions can be obtained by controlling an equivalent of the base [J. Chem. Soc. Perkin Trans. 1, 1986, 1845-1854; and J. Chem. Soc. Perkin Trans 1, 1993, 321-326].

Specifically, when 2 to 3 equivalents of the base is used relative to the amount of the trihalocyclopropane, this thereby produces the cyclopropenyl anions which react with water to immediately produce cyclopropene derivatives. The reaction for the above synthetic process is as follows.

[Reaction Scheme 2]

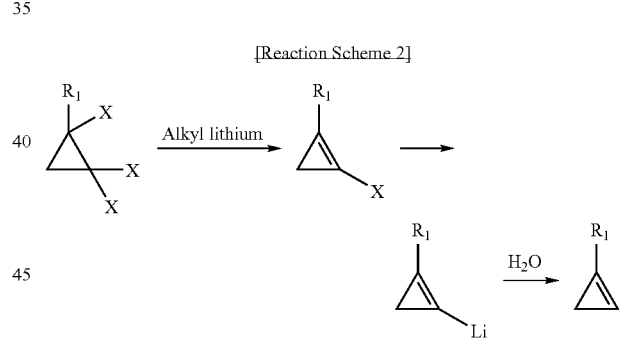

As the third method, the cyclopropene derivative can be simply prepared by the reaction of halocyclopropene with base. Herein, halocyclopropene can be prepared by reducing dihalocyclopropene produced from the reaction of olefin and dihalocarbene [Synthesis, 1974, 190; and Russian J. of Org. Chem. 15 (1979) 853-859]. The reaction scheme for the above synthetic process is as follows.

[Reaction Scheme 3]

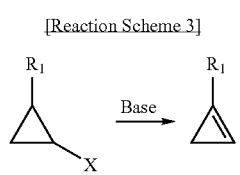

As the fourth method, the cyclopropene derivative can be prepared by the reaction of 1-trialkylsilyl-2-halocyclopropane or a chemical equivalent thereof with fluoride anions (F⁻) [J. Am. Chem. Soc., 113 (1991), 5084-5085; J. Am. Chem. Soc., 113 (1991), 7980-7984; Tetrahedron Lett. 36 (1995), 3457-3460; Tetrahedron Lett. 39 (1975) 3383-3386; J. Org. Chem. 65 (2000), 6217-6222; and J. Chem. Soc. Perkin Trans 1, 1993, 945].

The reaction scheme for the above synthetic process is as follows.

[Reaction Scheme 4]

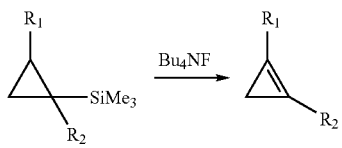

In Reaction Scheme 4, if $R_1$ is hydrogen, $R_2$ is hydrogen or an alkyl such as methyl, ethyl, propyl, isopropyl, butyl, isobutyl or pentyl, and if $R_2$ is hydrogen, $R_1$ is hydrogen or an alkyl such as methyl, ethyl, propyl, isopropyl, butyl, isobutyl, pentyl, hexyl, heptyl or octyl.

Therefore, in the device of the present invention, the cyclopropene precursors stored in the first storage part may be allyl halide or equivalents thereof, trihalocyclopropane or equivalents thereof, halocyclopropane or equivalents thereof and 1-silyl-2-halocyclopropane or equivalents thereof, and the reaction reagent stored in the second storage part is a base or fluoride anion material.

First, the precursors used in the synthetic processes for preparation of the cyclopropene derivatives will be specifically reviewed hereinafter.

In the first synthetic method, the allyl halide or equivalents thereof, as the precursor for preparation of the cyclopropene derivatives, may be selected from the group consisting of 3-chloropropene, 3-bromopropene, 2-methyl-3-chloropropene, 2-methyl-3-bromopropene, 2-methyl-3-iodopropene, 2-ethyl-3-chloropropene, 2-ethyl-3-bromopropene, 2-ethyl-3-iodopropene, 2-methyl-3-methanesulfonyloxypropene, 2-methyl-3-benzenesulfonyloxypropene and any combination thereof.

In the second synthetic method, the trihalocyclopropane or equivalents thereof, as the precursor for preparation of the cyclopropene derivatives, may be selected from the group consisting of 1,2,2-trichlorocyclopropane, 1,2,2-tribromocyclopropane, 1-bromo-2,2-dichlorocyclopropane, 1-chloro-2,2-dibromocyclopropane, 1-methyl-1,2,2-trichlorocyclopropane, 1-methyl-1,2,2-tribromocyclopropane, 1-methyl-1-bromo-2,2-dichlorocyclopropane, 1-methyl-1-chloro-2,2-dibromocyclopropane, 1-ethyl-1,2,2-trichlorocyclopropane, 1-ethyl-1,2,2-tribromocyclopropane, 1-ethyl-1-bromo-2,2-dichlorocyclopropane, 1-ethyl-1-chloro-2,2-dibromocyclopropane and any combination thereof.

In the third synthetic method, the halocyclopropane or equivalents thereof may be selected from the group consisting of chlorocyclopropane, bromocyclopropane, iodocyclopropane, cyclopropane methanesulfonate, cyclopropane benzenesulfonate, cyclopropane toluenesulfonate, 1-chloro-1-methylcyclopropane, 1-bromo-1-methylcyclopropane, 1-iodo-1-methylcyclopropane, 1-methanesulfonyloxy-1-methylcyclopropane, 1-chloro-1-ethylcyclopropane, 1-bromo-1-ethylcyclopropane, 1-iodo-1-ethylcyclopropane, 1-methanesulfonyloxy-1-ethylcyclopropane, 1-chloro-2-methylcyclopropane, 1-chloro-2-ethylcyclopropane and any combination thereof.

In the fourth synthetic method, 1-trialkylsilyl-2-halocyclopropane or equivalents thereof, as the precursor for preparation of the cyclopropene derivatives, may be selected from the group consisting of 1-trimethylsilyl-2-chlorocyclopropane, 1-trimethylsilyl-2-bromocyclopropane, 1-trimethylsilyl-2-methanesulfonyloxycyclopropane, 1-trimethylsilyl-2-benzenesulfonyloxycyclopropane, 1-trimethylsilyl-2-toluenesulfonyloxycyclopropane, 1-methyl-1-trimethylsilyl-2-chlorocyclopropane, 1-methyl-1-trimethylsilyl-2-bromocyclopropane, 1-methyl-1-trimethylsilyl-2-methanesulfonyloxycyclopropane, 1-methyl-1-trimethylsilyl-2-benzenesulfonyloxycyclopropane, 1-methyl-1-trimethylsilyl-2-toluenesulfonyloxycyclopropane, 2-methyl-1-trimethylsilyl-2-chlorocyclopropane, 2-methyl-1-trimethylsilyl-2-bromocyclopropane, 2-methyl-1-trimethylsilyl-2-methanesulfonyloxycyclopropane, 2-methyl-1-trimethylsilyl-2-benzenesulfonyloxycyclopropane, 2-methyl-1-trimethylsilyl-2-toluenesulfonyloxycyclopropane, 3-methyl-1-trimethylsilyl-2-chlorocyclopropane, 3-methyl-1-trimethylsilyl-2-bromocyclopropane, 3-methyl-1-trimethylsilyl-2-methanesulfonyloxycyclopropane, 3-methyl-1-trimethylsilyl-2-benzenesulfonyloxycyclopropane, 3-methyl-1-trimethylsilyl-2-toluenesulfonyloxycyclopropane, 1-ethyl-1-trimethylsilyl-2-chlorocyclopropane, 1-ethyl-1-trimethylsilyl-2-bromocyclopropane, 1-ethyl-1-trimethylsilyl-2-methanesulfonyloxycyclopropane, 1-ethyl-1-trimethylsilyl-2-benzenesulfonyloxycyclopropane, 1-ethyl-1-trimethylsilyl-2-toluenesulfonyloxycyclopropane and any combination thereof.

Furthermore, the trimethylsilyl group may be various forms of silyl derivatives such as triethylsilyl, tripropylsilyl, triphenylsilyl, trimethoxysilyl, triethoxysilyl, t-butyldimethylsilyl, dimethylmethoxysilyl, dimethylethoxysilyl, dimethylpropoxysilyl, dimethylisopropoxysilyl, dimethyl tert-butoxysilyl and the like.

In addition, the base and fluoride ion material used as the reaction reagents will be specifically illustrated hereinafter.

Examples of the base that can be used in the present invention may include strong bases such as $NaNH_2$, $KNH_2$, $LiNH_2$, $NaNMe_2$, $KNMe_2$, $LiNMe_2$, $NaNEt_2$, $LiNEt_2$, $NaNiPr_2$, $LiNiPr_2$, $LiN(SiMe_3)_2$, $NaN(SiMe_3)_2$, MeLi, EtLi, PrLi, BuLi, t-BuLi, s-BuLi, PhLi, NaOMe, KOMe, NaOEt, KOEt, NaOPr, NaOBu, t-BuONa, t-BuOK, NaH, KH, LiH and the like.

Examples of the fluoride ion material that can be used in the present invention may include fluoride salts in the form of alkyl or aryl ammonium salts, such as $Bu_4NF$, $Pr_3NF$, $Me_4NF$, $Et_4NF$, $Pentyl_4NF$, $Hexyl_4NF$, $BnBu_3NF$, $BnPr_3NF$, $BnMe_3NF$ and $BnEt_3NF$, and inorganic fluoride salts such as NaF, LiF, KF and the like.

Among the above-mentioned synthetic methods, more preferred is the fourth method using fluoride, because strong bases such as methyl lithium, butyl lithium, phenyl lithium, sodium amide, lithium amide, lithium diisopropyl amide, potassium t-butoxide and sodium t-butoxide are not only harmful and dangerous, but the fourth is also most exact and fast as a method generating cyclopropene compounds.

Therefore, the device for generation of cyclopropene compounds based on the fourth synthetic method, as a particularly preferred embodiment of the present invention, will be described in more detail hereinafter.

Cyclopropene derivatives can be conveniently prepared simply by mixing β-halocyclopropylsilane represented by Formula II below or their chemical equivalents thereof with a fluoride ion material or by contacting them to each other. Such a reaction may be expressed by Reaction Scheme 5 below:

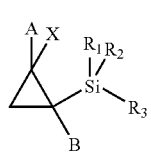 (II)

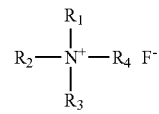 (III)

[Reaction Scheme 5]

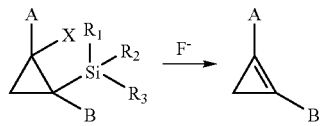

wherein, $R_1$, $R_2$ and $R_3$ are each independently hydrogen, $C_1$-$C_{10}$ alkyl or alkoxy, $C_3$-$C_{10}$ allyl, or halogen, such as Me, Et, Pr, Bu, t-Bu, i-Bu, Ph, Tol, MeO, EtO, PrO, BuO, chlorine, fluorine, bromine;

one of A and B is hydrogen, and the other is hydrogen, a $C_1$-$C_8$ alkyl, alkenyl or alkynyl or aryl such as methyl, ethyl, propyl, isopropyl, butyl, isobutyl, pentyl, isopentyl, hexyl, heptyl, octyl, phenyl, ethenyl, ethynyl, methoxymethyl, methoxyethyl, ethoxymethyl and ethoxyethyl, or a substituted alkyl, alkenyl or alkynyl containing oxygen or halogen; and X is an appropriate leaving group containing a halogen such as chlorine, fluorine, bromine or iodine, or oxygen (O), sulfur (S), selenium (Se), nitrogen (N), or phosphorus (P).

In connection with the leaving groups containing oxygen (O), sulfur (S), selenium (Se), nitrogen (N), or phosphorus (P), representative examples of the leaving group containing oxygen (O) include ROSO₂—O—, RSO₂—O—, RSO—O—, RS—O—, R—O—, RCO—O—, ROCO—O—, RNHCO—O—, RSe—O—, (RO)₂P—O— and (RO)₂PO—O—;

representative examples of the leaving group containing sulfur (S) or selenium (Se) include ROSO₂—, RSO₂—, RSO—, RS—, ROSO—, ROS—, RSe and RSeO—; and representative examples of the leaving group containing nitrogen (N) or phosphorus (P) include R₃N—, R₂N—, RNH—, NH₂—, R₂P—, R₃P⁺—, (RO)₂P— and (RO)₂PO—.

In addition, the reaction synthesizing the cyclopropene derivatives by reacting the β-halocyclopropylsilane or their chemical equivalents thereof with the fluoride ion material coated on an inorganic material such as silica or alumina is a stable and convenient method that can be employed in the reaction for synthesis of the highly labile cyclopropene derivative such as spiropentadiene (J. Am. Chem. Soc., 113 (1991), 5084-5085) or oxaspiropentene (Org. Lett., 1 (1999), 115-116), represented by the following Structural Formula:

 

<Spiropentadiene>  <Oxaspiropentene>

The fluoride ion material may be preferably tetraalkylammonium fluoride represented by Formula III below:

wherein $R_1$, $R_2$, $R_3$ and $R_4$ are each independently $C_1$-$C_{20}$ alkyl, or aryl, such as methyl, ethyl, propyl, isopropyl, butyl, isobutyl, pentyl, hexyl, heptyl, octyl, decyl, phenyl or benzyl.

The fluoride ion material may be used per se or may be dissolved in a solvent for use. Particularly, the fluoride ion material may be used in an adsorption thereof on a solid particle such as silicate, alumina, clay, sand, polymer resin or the like. As a result, the constitution of the device may be further simplified.

Hence, in one preferred embodiment, solid particles, the surface of which was coated with the fluoride ion material as the reaction reagent, are filled in the second storage container to which the spray part is directly or is integrated as a part thereof, and the first storage container is selectively interconnected with the second storage container. Therefore, the device having a compact size may be prepared.

In accordance with another aspect of the present invention, there is provided a method of storing the harvested agricultural products such as fruits, flowers and vegetables, using the above-mentioned device for generation of cyclopropene derivatives. The techniques of inhibiting ripening process of fruits and the like using the cyclopropene derivatives are well known in the art, and therefore the detailed description thereof will be omitted.

Among the illustrated precursors in connection with preparation of the cyclopropene derivatives inhibiting the ethylene action which accelerates ripening process of plants, β-halocyclopropylsilane derivatives represented by Formula IIA are novel compounds per se:

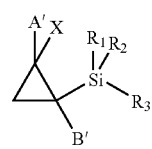 (IIA)

wherein $R_1$, $R_2$ and $R_3$ are each independently hydrogen, $C_1$-$C_{10}$ alkyl or alkoxy, $C_3$-$C_{10}$ allyl, or halogen;

at least one of A' and B' is hydrogen; if A' is hydrogen, B' is hydrogen, methyl or ethyl; and if B' is hydrogen, A' is hydrogen, methyl or ethyl; and X is a leaving group containing a halogen, oxygen (O), sulfur (S), selenium (Se), nitrogen (N), or phosphorus (P).

Among β-halocyclopropylsilane derivatives represented by Formula IIA, materials of Formula IIA wherein A' is an alkyl having more than three carbon atoms are known in the art, but materials of Formula IIA wherein A' and B' are as defined above are novel materials. The inventor of the present invention has confirmed that these novel materials can also be used as useful precursors for the preparation of cyclopropene derivatives.

Among them, preferred are compounds of Formula IIA wherein B' is hydrogen, and A' is hydrogen, methyl or ethyl.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, the present invention will be described in more detail with reference to the accompanying drawings.

Figure 1:
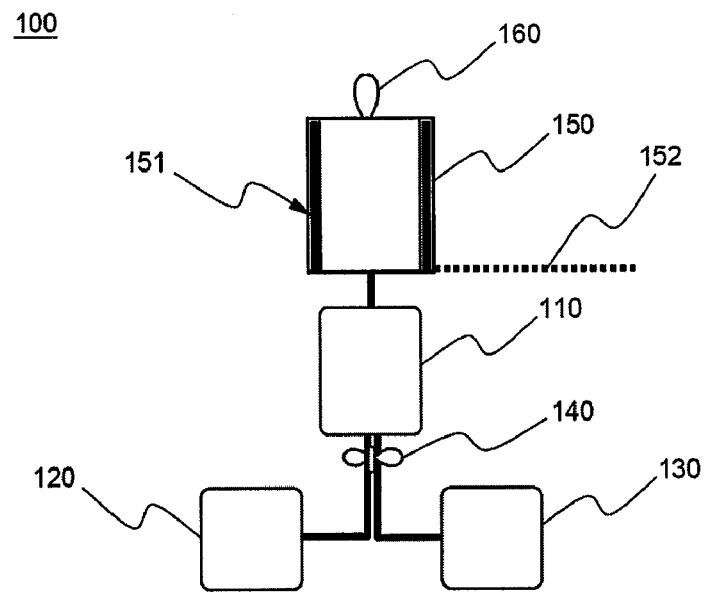
FIGS. 1 and 2 are schematic views showing a device for generation of cyclopropene derivatives according to one embodiment of the present invention.

FIG. 1 schematically shows a device for generation of cyclopropene derivatives according to one embodiment of the present invention.

Referring to FIG. 1, a device 100 for generation of cyclopropene derivatives includes a first storage container 120 for storing cyclopropene precursors as raw materials, a second storage container 130 for storing a base or fluoride ion material as a reaction reagent, a reaction vessel 110 for reaction of the cyclopropene precursor and reaction reagent, and a filter 150 for removing reaction impurities.

The cyclopropene precursor and the reaction reagent are respectively introduced in a given amount to the reaction vessel 110 via a control valve 140, and undergo chemical reaction to synthesize cyclopropene derivatives. The thus-synthesized cyclopropene derivatives are filtered through a filter 150 surrounded by a heating coil 151 connected to a power supply 152, and then sprayed to the outside through a nozzle 160.

Figure 2:
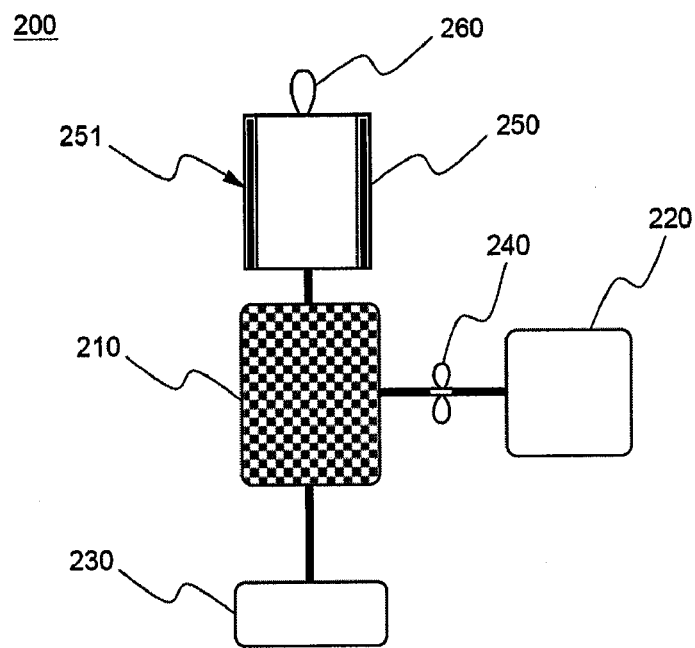

FIG. 2 schematically shows a device for generation of cyclopropene derivatives according to another embodiment of the present invention.

Referring to FIG. 2, in a device 200 for generation of cyclopropene derivatives, a fluoride ion material, adsorbed on silica gel (not shown), is placed in a reaction vessel 210, one side of which is provided with a compressor 230 for injection of air into the reaction vessel. The cyclopropene precursors in a storage container 220 are introduced into the reaction vessel 210 via a control valve 240, and the air injected through the compressor 230 serves to guide the cyclopropene derivatives synthesized in the reaction vessel 210 toward a filter 250. The thus-guided cyclopropene derivatives pass through the filter 250, the outside of which is provided with a heating coil 251, and are discharged via a spray nozzle 260 to the outside. In addition, there is no need for a separate storage container for storing the reaction reagent, because the fluoride ion material used as the reaction reagent is adsorbed on the surface of silica gel in the reaction vessel 210.

Although the device 200 for generating cyclopropene derivatives is configured to have a structure facilitating evaporation of the cyclopropene derivatives synthesized through the compressor 230 and the heating coil 251, cyclopropene and 1-methylcyclopropene per se are gaseous at room temperature and may thus be directly evaporated and discharged to the surroundings without installation of an additional evaporating device such as compressor 230 or heating coil 251.

Figure 3:
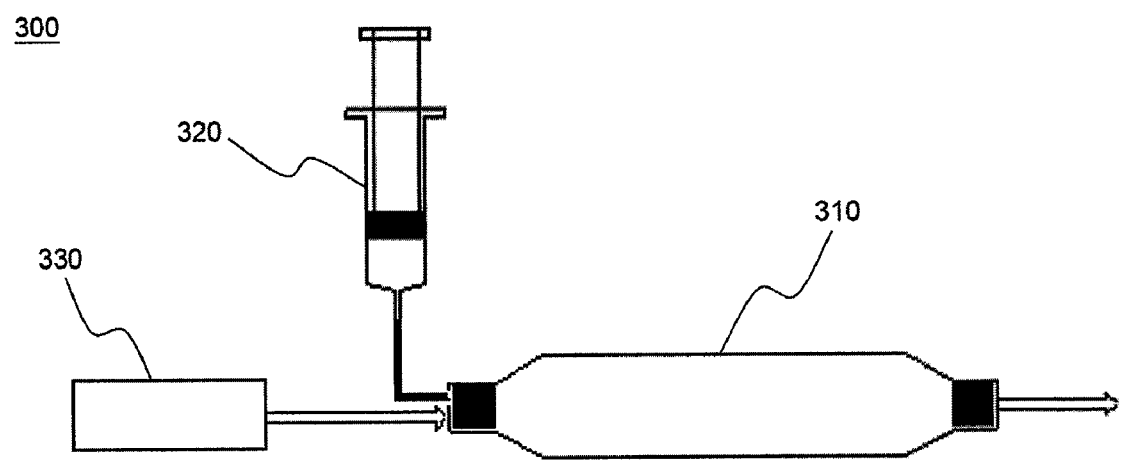
FIG. 3 is a schematic view showing a device for generation of cyclopropene derivatives according to another embodiment of the present invention.

FIG. 3 schematically shows a device for generation of cyclopropene derivatives according to a further embodiment of the present invention.

Referring to FIG. 3, a device 300 for generation of cyclopropene derivatives includes a reaction vessel 310 in which cyclopropene derivatives are synthesized, an injector 320 for supplying cyclopropene precursors, and a compressor 330 for supplying air into the reaction vessel 310.

Tetrabutylammonium fluoride ($Bu_4NF$), adsorbed on silica gel (not shown), is placed in the reaction vessel 310, and reacts with the cyclopropene precursors supplied by the injector 320 to synthesize cyclopropene derivatives. The thus-synthesized cyclopropene derivatives are sprayed to the outside through the medium of the flow of air supplied via the compressor 330.

EXAMPLES

Now, the present invention will be described in more detail with reference to the following Examples. These examples are provided only for illustrating the present invention and should not be construed as limiting the scope and spirit of the present invention.

Example 1

Synthesis of 1-methylcyclopropene from methallyl chloride 1.8 g of methallyl chloride was dissolved in 3 mL of anhydrous decane, and anhydrous decane was additionally added to make a 5 mL volume of the resulting solution which was then placed in Container I. 20 mL of a solution of 2.0 M phenyllithium in cyclohexane was placed in Container II. An injection valve was set such that the solution of Container I was discharged at a rate of 0.1 mL/min into Container II, under ambient temperature conditions. And then, in order to promote the discharge of 1-methylcyclopropene gas generated from Container II, an air flow was maintained at a flow rate of 100 mL/min by installing a small compressor at one end of Container II. At this time, the gas discharged via a nozzle was collected and subjected to molecular weight analysis using GC/MS. As a result, it was confirmed that the detected gas was 1-methylcyclopropene and an isomer thereof (MW: 54).

Example 2

Synthesis of 1-methylcyclopropene from 1-methyl-1,2,2-tribromocyclopropane 2.95 g of 1-methyl-1,2,2-tribromocyclopropane, obtained from reaction of 2-bromopropene and bromoform, was dissolved in 5 mL of anhydrous decane, and anhydrous decane was additionally added to make a 10 mL volume of the resulting solution which was then placed in Container I. 20 mL of a solution of 2.0 M butyllithium in decane was placed in Container II. An injection valve was set such that under ambient temperature conditions, the solutions of Container I and Container II were discharged at a rate of 0.1 mL/min and 0.2 mL/min into another reaction vessel, Container III, respectively. The thus-discharged solutions were homogeneously mixed in Container III, and upon reaching more than 2 mL of the reaction solution volume, were allowed to be spontaneously overflowed and slowly dropped in a water bucket containing 10 mL of water. And then, in order to promote the discharge of 1-methylcyclopropene gas generated from water bucket, an air flow was maintained at a flow rate of 100 mL/min by installing a small compressor at one end of water bucket. The gas discharged in the water bucket via the nozzle was collected and subjected to molecular weight analysis using GC/MS. As a result, it was confirmed that the analyzed gas was composed of 1-methylcyclopropene and an isomer thereof (MW: 54).

Example 3

Synthesis of Cyclopropene from Bromocyclopropane 1.5 g of bromocyclopropane was placed in Container I, and 20 mL of 15% potassium t-butoxide t-butanol solution was placed in Container II. Thereafter, the solution of Container I was slowly released at a rate of 1.0 mL/min into Container II. And then, in order to promote the discharge of cyclopropene gas generated from Container II, an air flow was maintained at a flow rate of 100 mL/min by installing a small compressor at one end of Container II. At this time, the gas discharged via a nozzle of Container II was collected and subjected to molecular weight analysis using GC/MS. As a result, it was confirmed that the analyzed gas was composed of cyclopropene and an isomer thereof (MW: 40).

Example 4

Synthesis of cyclopropene from 1-chloro-2-(trimethylsilyl)cyclopropane (1) Preparation of 1-chloro-2-(trimethylsilyl)cyclopropane 2.0 g of vinyltrimethylsilane and 17.0 g of dichloromethane were placed in a 100 mL three-neck round bottom flask and cooled to 0° C. in an ice bath. The reaction solution was vigorously stirred while 70 mL of a solution of 1.6 M methyl lithium in ether was gradually added over 30 min. The reaction solution was warmed to room temperature and then stirred for another 30 min. 20 mL of saturated brine was added to the solution. An ether layer was separated from the mixture, dried over anhydrous magnesium sulfate ($MgSO_4$), and concentrated by maintaining maintained the ether layer at 60° C. of a water bath. The resulting concentrate was distilled at 25 to 45° C. under vacuum conditions using an aspirator to thereby obtain 0.23 g of a transparent liquid. The thus-obtained liquid was an ethyl ether solution in which two isomers, i.e. trans and cis mixtures of 1-chloro-2-(trimethylsilyl)cyclopropane were dissolved together. Results of $^1$H-NMR for the major isomer of the mixture are given below.

$^1$H-NMR ($CDCl_3$, δ): 2.83-2.87 (1H, m), 0.98-1.06 (1H, m), 0.72-0.81 (1H, m), 0.16-0.25 (1H, m), 0.128 (9H, s).

(2) Preparation of Cyclopropene 100 g of 75% aqueous tetrabutylammonium fluoride ($Bu_4NF$) solution was added to 500 mL of methanol, and the solution was homogeneously mixed with 425 g of finely ground silica gel powder. The mixture was heated to 80° C. to distill off solvent under vacuum thoroughly. 5 g of the thus treated and thoroughly dried silica gel ($Bu_4NF$ 15% on Silica gel) was filled in a hollow glass rod, and both ends of the glass rod were tightly plugged with cotton. In order to induce an air flow inside the glass rod in one direction, the air flow was maintained at a flow rate of 100 mL/min, by installing a small compressor at one end of the glass rod. 2.0 mL of the ethyl ether solution containing 10% of 1-chloro-2-(trimethylsilyl)cyclopropane, synthesized in Section (1), was simultaneously injected into an air inlet of the glass rod using a syringe. Gas discharged from the opposite end of the glass rod was collected for 1 hour, and constituents of the gas were analyzed using GC/MS analysis system. It was confirmed that the collected gas contained cyclopropene (MW: 40).

Example 5

Synthesis of 1-methylcyclopropene from 1-methyl-1-(methanesulfonyloxy)-2-(trimethylsilyl)cyclopropane (1) Synthesis of 1-methyl-1-hydroxy-2-(trimethylsilyl)cyclopropane 2.02 g of magnesium and 30 mL of ethyl ether were charged to a 100 mL three-neck round bottom flask to which 6.3 g of 2-chloropropane was then gradually added to prepare a Grignard solution. 10.7 g of titanium (IV) isopropoxide and 3.7 g of vinyltrimethylsilane were added to another 100 mL three-neck round bottom flask cooled to −78° C., and the above-prepared Grignard solution was gradually added thereto over 30 min. The thus-prepared reaction solution was warmed to −50° C. and vigorously stirred for 2 hours. The reaction solution was maintained at −50° C. while 3.5 g of ethyl acetate was gradually added over 30 min. The reaction solution was warmed to −20° C., vigorously stirred for 1 hour, warmed to 0° C. and then vigorously stirred for another 1 hour. The reaction solution was warmed to room temperature and 7 mL of saturated brine was added to the solution. The resulting solution was filtered through Celite which was then thoroughly washed once more with 20 mLL of ether. The thus-obtained filtrate was dried over anhydrous magnesium sulfate ($MgSO_4$), and was concentrated by the evaporation of solvent under low vacuum at a low temperature of less than 30° C. The resulting concentrate was distilled (35-50° C./0.1 mmHg) to thereby give 2.2 g of 1-methyl-1-hydroxy-2-(trimethylsilyl)cyclopropane as a mixture of two isomers, i.e. trans and cis isomers in a ratio of 3 to 5:1. Results of $^1$H-NMR and $^{13}$C-NMR for the major isomer (trans isomer) of the mixture are given below.

$^1$H-NMR ($CDCl_3$, δ): 1.934 (1H, b, —OH), 0.985 (1H, dd), 0.394 (1H, dd), 0.064 (1H, dd), 0.022 (9H, s).

$^{13}$C-NMR ($CDCl_3$, δ): 66.178, 23.551, 18.255, 14.106, −0.859.

Results of $^{13}$C-NMR for the minor isomer (cis isomer) of the mixture are given below.

$^{13}$C-NMR ($CDCl_3$, δ): 57.085, 27.140, 18.065, 14.370, −0.587.

(2) Synthesis of 1-methyl-1-(methanesulfonyloxy)-2-(trimethylsilyl)cyclopropane 2.2 g of a trans and cis mixture of 1-methyl-1-hydroxy-2-(trimethylsilyl)cyclopropane, prepared in Section 1, was dissolved in 15 mL of dichloromethane, and 1.7 g of triethylamine was added to the resulting solution. The reaction mixture was cooled to 0° C., 1.8 g of methanesulfonylchloride was gradually added thereto and the mixture was vigorously stirred for 1 hour. 5 mL of a saturated $NaHCO_3$ solution was added to the reaction mixture, thereby terminating the reaction. An organic layer was separated, dried over anhydrous magnesium sulfate ($MgSO_4$), and concentrated by low vacuum distillation at a low temperature of less than 30° C. Although it may be used directly without any further purification, the concentrate was finely purified by vacuum distillation (65-70° C./0.1 mmHg). As a result, 2.8 g of 1-methyl-1-(methanesulfonyloxy)-2-(trimethylsilyl)cyclopropane was obtained as a mixture of cis and trans isomers in a ratio of 3 to 4:1. Results of $^1$H-NMR and $^{13}$C-NMR for the major isomer (trans isomer) of the mixture are given below.

$^1$H-NMR ($CDCl_3$, δ): 1.705 (3H, s), 1.399 (1H, dd), 0.584 (1H, dd), 0.539 (1H, dd), 0.074 (9H, s).

$^{13}$C-NMR ($CDCl_3$, δ): 67.348, 40.075, 21.539, 16.053, 12.712, −1.197.

Results of $^{13}$C-NMR for the minor isomer (cis isomer) of the mixture are given below.

$^{13}$C-NMR (CDCl$_3$, δ): 68.709, 40.073, 24.333, 16.985, 13.248, −1.106.

(3) Synthesis of 1-methylcyclopropene 2.65 g of 1-methyl-1-(methanesulfonyloxy)-2-(trimethylsilyl)cyclopropane prepared in Section (2) was dissolved in 3 mL of diglyme and the resulting solution was then placed in Container I. 3.0 g of tetrabutylammonium fluoride was dissolved in 6 mL of diglyme and the resulting solution was placed in Container II. An injection valve was set such that the solution of Container I was discharged at a rate of 0.2 mL/min into Container II, under ambient temperature conditions. And then, in order to promote the discharge of 1-methylcyclopropene gas generated from Container II, an air flow was maintained at a flow rate of 100 mL/min by installing a small compressor at one end of Container II. And then, the gas discharged via a nozzle was passed through 15% NaOH aqueous solution to remove by-product like trimethylsilyl fluoride. Consequently, the resulting gas was treated using dry ice/acetone trap (−78° C.) to give 0.2 g of clear liquid. The liquid was subjected to GC/MS, $^1$H-NMR and $^{13}$C-NMR. As a result, it was confirmed that the liquid was pure 1-methylcyclopropene (MW: 54). Results of $^1$H-NMR and $^{13}$C-NMR are given below.

$^1$H-NMR (CDCl$_3$, δ): 6.42 (1H, s), 2.14 (3H, s), 0.88 (2H, s).

$^{13}$C-NMR (CDCl$_3$, δ): 116.73, 98.58, 12.88, 6.10.

Example 6

Synthesis of 1-methylcyclopropene from 1-methyl-1-(methanesulfonyloxy)-2-(dimethylisopropoxysilyl)cyclopropane

(1) Synthesis of 1-methyl-1-hydroxy-2-(dimethylisopropoxysilyl)cyclopropane The synthetic procedure was the same as in Section 1 of Example 5 except that 3.6 g of chlorodimethylvinylsilane was used instead of vinyltrimethylsilane. Thus, 1-methyl-1-hydroxy-2-(trimethylsilyl)cyclopropane (35-50° C./0.01 mmHg) was obtained as a mixture of two isomers, i.e. trans and cis isomers in a ratio of 3 to 4:1. Results of $^1$H-NMR for the major isomer (trans isomer) of the mixture are given below.

$^1$H-NMR (CDCl$_3$, δ): 4.13 (1H, m), 1.51 (3H, s), 1.18 (3H, d), 1.15 (3H, d), 1.03 (1H, dd), 0.54 (1H, dd), 0.18 (1H, dd), 0.13 (3H, s), 0.12 (3H, s).

(2) Synthesis of 1-methyl-1-(methanesulfonyloxy)-2-(dimethylisopropoxysilyl)cyclopropane The synthetic procedure was the same as in Section 2 of Example 5 except that dimethylisopropoxysilyl derivative was used instead of trimethylsilyl derivative.

Thus, 1-methyl-1-(methanesulfonyloxy)-2-(dimethylisopropoxysilyl)cyclopropane (55-60° C./0.1 mmHg) was obtained as a mixture of two isomers, i.e. trans and cis isomers in a ratio of 3 to 4:1. Results of $^1$H-NMR for the major isomer (trans isomer) of the mixture are given below.

$^1$H-NMR (CDCl$_3$, δ): 4.02 (1H, m), 2.97 (3H, s), 1.76 (3H, s), 1.42 (1H, dd), 1.15 (6H, d), 0.72 (1H, dd), 0.59 (1H, dd), 0.21 (3H, s), 0.19 (3H, s).

(3) Synthesis of 1-methylcyclopropene

The synthetic procedure was the same as in Section 3 of Example 5 except that dimethylisopropoxysilyl derivative was used instead of trimethylsilyl derivative. Moreover, aqueous NaOH filter to remove by-products like silyl species was not adapted in this case.

Thus, when the gas discharged via a nozzle was treated using dry ice/acetone trap (−78° C.), clear liquid was condensed and subjected to molecular weight analysis using GC/MS. It was confirmed that the liquid was pure 1-methylcyclopropene (MW: 54).

Example 7

Synthesis of 1-ethylcyclopropene from 1-ethyl-1-(ethanesulfonyloxy)-2-(trimethylsilyl)cyclopropane

(1) Synthesis of 1-ethyl-1-hydroxy-2-(trimethylsilyl)cyclopropane

Similarly to the method given in Section (1) of Example 5, 2.02 g of magnesium and 6.3 g of 2-chloropropane were used to prepare a Grignard solution. The resulting solution was cooled to −78° C. and reacted with 10.7 g of titanium (IV) isopropoxide and 3.7 g of vinyltrimethylsilane. The thus-prepared reaction solution was warmed to −50° C. and vigorously stirred for 2 hours. The reaction solution was maintained at −5° C. while 4.1 g of ethyl propionate was gradually added over 30 min. The reaction solution was warmed to −20° C., vigorously stirred for 1 hour, warmed to 0° C. and then vigorously stirred for another 1 hour. The reaction solution was warmed to room temperature and 7 mL of strong brine was added to the solution. The resulting solution was filtered through Celite which was then thoroughly washed once more with 20 mL of ether. The thus-obtained filtrate was dried over anhydrous magnesium sulfate (MgSO$_4$), and concentrated by solvent distillation at a low temperature of less than 30° C. The resulting concentrate was distilled under high vacuum conditions (35-50° C./0.01 mmHg) to thereby obtain 2.6 g of 1-ethyl-1-hydroxy-2-(trimethylsilyl)cyclopropane as a mixture of cis and trans isomers. The mixture was purified by silica gel chromatography to separate only the trans isomer. Results of $^1$H-NMR for the trans isomer are given below.

$^1$H-NMR (CDCl$_3$, δ): 1.94 (1H, b), 1.68 (1H, m), 1.48 (1H, b), 1.10 (3H, t), 0.96 (1H, dd), 0.36 (1H, dd), 0.08 (1H, dd), 0.03 (9H, s).

(2) Synthesis of 1-ethyl-1-(ethanesulfonyloxy)-2-(trimethylsilyl)cyclopropane 2.5 g of 1-ethyl-1-hydroxy-2-(trimethylsilyl)cyclopropane prepared in Section (1) was dissolved in 15 mL of dichloromethane, and 2.3 g of triethylamine was added to the resulting solution. The reaction solution thus prepared was cooled to 0° C., 1.8 g of ethanesulfonylchloride was gradually added thereto and the mixture was vigorously stirred for 1 hour. 5 mL of a saturated NaHCO$_3$ solution was added to the reaction solution, thereby terminating the reaction. An organic layer was separated from the reaction solution, dried over anhydrous magnesium sulfate (MgSO$_4$), and concentrated by solvent distillation at a low temperature of less than 30° C. Although it may be used directly without any further treatment, the resulting concentrate was purified by silica gel chromatography using hexane and ethyl acetate to obtain 1.62 g of 1-ethyl-1-(ethanesulfonyloxy)-2-(trimethylsilyl)cyclopropane as a pure trans isomer. Results of $^1$H-NMR and $^{13}$C-NMR for the trans isomer are given below.

$^1$H-NMR (CDCl$_3$, δ): 3.06 (2H, q), 2.13 (1H, m), 1.53 (1H, dd), 1.40 (3H, t), 1.32 (1H, m), 1.17 (1H, t), 0.68 (1H, dd), 0.48 (1H, dd), 0.09 (9H, s).

$^{13}$C-NMR (CDCl$_3$, δ): 71.852, 46.928, 28.459, 14.710, 13.311, 10.513, 8.211, −1.088.

(3) Synthesis of 1-ethylcyclopropene 0.50 g of 1-ethyl-1-(ethanesulfonyloxy)-2-(trimethylsilyl)cyclopropane prepared in Section (2) was dissolved in 3 mL of triglyme. 5 g of alumina-supported 15% Bu$_4$NF (Aldrich 33, 195-3) was packed in a glass rod. While maintaining the air flow at a flow rate of 1 L/min using a small compressor, the solution of 1-ethyl-1-(ethanesulfonyloxy)-2-(trimethylsilyl)cyclopropane was simultaneously injected into an air inlet of the glass rod using a syringe. Gas discharged from the opposite end of the glass rod was collected, and constituents of the gas were analyzed using a GC/MS. It was confirmed that the analyzed gas contained 1-ethylcyclopropene (MW: 68).

Experimental Example 1

Inhibitory Effects of Cyclopropene Compounds on Tomato Ripening

A cube (60×60×60 cm) was fabricated using a transparent acrylic plastic plate. The upper surface of the cube was equipped with two valves for air-injection and exhaust. Immediately prior to beginning of the red ripening stages, 20 blue tomatoes were harvested and divided into a treatment group and a control group which were then placed in acrylic plastic vessels, respectively. Among two plastic vessels, the treatment group was treated with 1-methylcyclopropene generated by injection of 3 mL diglyme solution containing 0.2 g of 1-methyl-1-(methanesulfonyloxy)-2-(trimethylsilyl)cyclopropane {synthesized in Section (2) of Example 5} into a column packed with 5 g of 15% Bu$_4$NF coated Silica gel {prepared in Section (2) of Example 4} while maintaining the air flow at a flow rate of 2 L/min using a small compressor (see FIG. 3).

Tomatoes of the treatment group were treated for 1 hour according to the above-mentioned method and were then left for 12 hours while closing the valve. And then, tomatoes of the treatment group and tomatoes of the control group were observed on a progress of turning into red color. Based on the observation results, the ripening progress of tomatoes was evaluated. The results thus obtained are given in Table 1 below.

Herein, the degree of ripening of tomatoes was classified on a scale of 0 to 5:
0: No red color similar to when completely green tomatoes were harvested
5: Completely ripened to dark red
1 to 4: Red color between the scale of 0 and 5
Therefore, the higher value represents the redder tomato color.

From the results of Table 1, it can be seen that tomatoes of the control group began to ripen after 1 day, most of them initiated the ripening process after about 3 days, and most of them completely ripened after 7 days. Whereas, it can be seen that tomatoes of the treatment group began the ripening process after about 3 days and most of them did not exhibit full ripening even after 10 days. As such, it can be confirmed that 1-methylcyclopropene generated by the device of the present invention exhibits significant inhibitory effects on the ripening process of tomatoes.

INDUSTRIAL APPLICABILITY

As apparent from the foregoing, the present invention provides a device which is simply and conveniently capable of achieving preparation and discharge of cyclopropene compounds such as cyclopropene, 1-methylcyclopropene, 1-ethylcyclopropene and the like, which are widely known to inhibit the action of ethylene which accelerates a ripening process of agricultural products such as fruits, flowers, vegetables and the like, as necessary. Therefore, the device of the present invention is expected to remarkably improve storability of harvested agricultural products in farmhouses and storehouses.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for generation of cyclopropene compounds and which is capable of achieving direct in situ preparation and application of cyclopropene compounds inhibiting the action of ethylene which accelerates the ripening process of plants, the device comprising:
   a reaction vessel;
   a first storage part in which cyclopropene precursors are stored, wherein the first storage part is fluidly connected to the reaction vessel,
   a second storage part in which reaction reagents which convert the cyclopropene precursors into cyclopropene compounds via chemical reaction are stored, wherein the second storage part is fluidly connected to the reaction vessel, and
   a spray part for spraying the cyclopropene compounds produced by the chemical reaction between the cyclopropene precursors and the reaction reagents, wherein the spray part is fluidly connected to the reaction vessel.

TABLE 1

| Degree of ripening | 0 | | 1 | | 2 | | 3 | | 4 | | 5 | |
|---|---|---|---|---|---|---|---|---|---|---|---|---|
| | Treated | Control | Treated | Control | Treated | Control | Treated | Control | Treated | Control | Treated | Control |
| Day 0 | 10 | 10 | 0 | 0 | 0 | 0 | 0 | 0 | 0 | 0 | 0 | 0 |
| Day 1 | 10 | 8 | 0 | 2 | 0 | 0 | 0 | 0 | 0 | 0 | 0 | 0 |
| Day 2 | 10 | 4 | 0 | 3 | 0 | 3 | 0 | 0 | 0 | 0 | 0 | 0 |
| Day 3 | 9 | 0 | 1 | 3 | 0 | 4 | 0 | 3 | 0 | 0 | 0 | 0 |
| Day 4 | 8 | 0 | 1 | 2 | 1 | 3 | 0 | 3 | 0 | 2 | 0 | 0 |
| Day 5 | 8 | 0 | 1 | 0 | 0 | 2 | 1 | 3 | 0 | 3 | 0 | 2 |
| Day 6 | 6 | 0 | 2 | 0 | 1 | 0 | 0 | 2 | 1 | 3 | 0 | 5 |
| Day 7 | 6 | 0 | 2 | 0 | 1 | 0 | 0 | 0 | 0 | 2 | 1 | 8 |
| Day 8 | 5 | 0 | 2 | 0 | 1 | 0 | 1 | 0 | 0 | 0 | 1 | 10 |
| Day 9 | 2 | 0 | 3 | 0 | 2 | 0 | 1 | 0 | 1 | 0 | 1 | 10 |
| Day 10 | 1 | 0 | 1 | 0 | 3 | 0 | 2 | 0 | 1 | 0 | 2 | 10 |

2. The device according to claim 1, wherein the first storage part is a first storage container and the second storage part is a second storage container, and the reaction vessel is selectively interconnected to the first storage container and the second storage container.

3. The device according to claim 1, wherein the first storage part is a first storage container and the second storage part is a second storage container, the spray part is directly connected to the second storage container or is integrated into the second storage container as a part thereof, and the first storage container is selectively interconnected with the second storage container.

4. The device according to claim 1, wherein the device further includes a carrier supply part for supplying a carrier gas as a medium toward the spray part.

5. The device according to claim 1, wherein the spray part includes one or more of a nozzle for controlling a spraying amount and direction of the cyclopropene compounds, a heater for facilitating evaporation of room-temperature liquid or solid cyclopropene compounds or gas-phase activation of room-temperature gaseous cyclopropene compounds and a filter for removing impurities from the reactants.

6. The device according to claim 1, wherein the cyclopropene compound is a material represented by Formula I:

(I)

wherein R is hydrogen; a $C_1$-$C_{10}$ alkyl; or a substituted alkyl containing oxygen, nitrogen, sulfur, silicon or halogen.

7. The device according to claim 1, wherein the cyclopropene compound is selected from the group consisting of cyclopropene, 1-methylcyclopropene, 1-ethylcyclopropene, 1-propylcyclopropene, 1-butylcyclopropene, 1-pentylcyclopropene, 1-hexylcyclopropene, 1-heptylcyclopropene, 1-octylcyclopropene and any combination thereof.

8. The device according to claim 1, wherein the cyclopropene precursor stored in the first storage part is allyl halide or an equivalent thereof, trihalocyclopropane or an equivalent thereof, halocyclopropane or an equivalent thereof, or 1-trialkylsilyl-2-halocyclopropane or an equivalent thereof, and the reaction reagent stored in the second storage part is a base or a fluoride ion material.

9. The device according to claim 8, wherein the 1-trialkylsilyl-2-halocyclopropane or an equivalent thereof as the cyclopropene precursor stored in the first storage part is a β-halocyclopropylsilane represented by Formula II or a haloequivalent thereof:

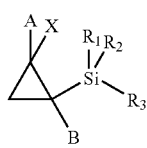

(II)

wherein, $R_1$, $R_2$ and $R_3$ are each independently hydrogen, $C_1$-$C_{10}$ alkyl or alkoxy, $C_3$-$C_{10}$ alkyl, halogen;
one of A and B is hydrogen, and the other is hydrogen, a $C_1$-$C_8$ alkyl, alkenyl or alkynyl or aryl; or a substituted alkyl, alkenyl or alkynyl containing oxygen or halogen; and X is a leaving group containing a halogen, oxygen (O), sulfur (S), selenium (Se), nitrogen (N), or phosphorus (P).

10. The device according to claim 8, wherein the fluoride ion material is tetraalkylammonium fluoride represented by Formula III:

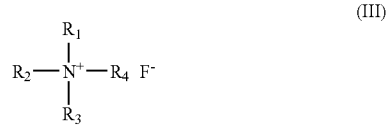

(III)

wherein, $R_1$, $R_2$, $R_3$ and $R_4$ are each independently $C_1$-$C_{20}$ alkyl, or aryl.

11. The device according to claim 10, wherein the fluoride ion material is itself, dissolved in solvent or adsorbed on solid particles.

12. The device according to claim 11, wherein solid particles having a surface coated with the fluoride ion material as the reaction reagent are filled in a second storage container as the second storage part, the spray part is directly connected to the second storage container or is integrated to the second storage container as a part thereof, and a first storage container as the first storage part is selectively interconnected with the second storage container.

13. A method for treating and storing harvested agricultural products, the method comprising treating an agricultural product with the device for generation of cyclopropene compounds of claim 1.

14. A device for generation of cyclopropene compounds, the device comprising:
a reaction vessel;
a fluoride ion material disposed in the reaction vessel;
a first storage container fluidly connected to the reaction vessel;
a cyclopropene precursor disposed in the first storage container; and
a spray part fluidly connected to the reaction vessel.

15. The device of claim 14, wherein the fluoride ion material comprises a tetraalkylammonium fluoride represented by Formula III:

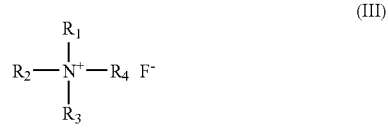

(III)

wherein, $R_1$, $R_2$, $R_3$ and $R_4$ are each independently $C_1$-$C_{20}$ alkyl, or aryl.

16. The device of claim 14, further comprising a compressor fluidly connected to the reaction vessel.

17. The device of claim 16, wherein the fluoride ion material further comprises silica gel.

18. The device of claim 14, further comprising a filter fluidly connected to and interposed between the spray part and the reaction vessel.

19. The device of claim 18, further comprising a heater disposed on the filter.

* * * * *